United States Patent [19]

Nakamachi et al.

[11] Patent Number: 5,066,525
[45] Date of Patent: Nov. 19, 1991

[54] LAMINATED GLASS PANEL INCORPORATING HOLOGRAM SHEET

[75] Inventors: Fumihiko Nakamachi; Masanori Umebayashi, both of Matsusaka, Japan

[73] Assignee: Central Glass Company, Limited, Ube, Japan

[21] Appl. No.: 466,852

[22] Filed: Jan. 18, 1990

[30] Foreign Application Priority Data

Jan. 25, 1989 [JP] Japan .................................. 1-7453[U]
Jan. 25, 1989 [JP] Japan .................................. 1-7454[U]

[51] Int. Cl.⁵ .............................................. B44F 1/10
[52] U.S. Cl. .................................. 428/29; 156/99; 428/141; 428/412; 428/437; 428/473.5; 428/474.4; 428/480; 428/500; 428/501; 430/1; 430/2; 359/13; 359/15
[58] Field of Search ............... 430/1, 2; 350/3.7, 3.85, 350/174; 156/99; 428/426, 437, 480, 414, 474.4, 473.5, 500, 220, 29, 141

[56] References Cited

U.S. PATENT DOCUMENTS 4,842,389 6/1989 Wood et al. ..................... 156/99

FOREIGN PATENT DOCUMENTS 64-4414 2/1986 Japan .

Primary Examiner—Merrell C. Cashion, Jr.
Assistant Examiner—D. S. Nakarani
Attorney, Agent, or Firm—Fleit, Jacobson, Cohn, Price, Holman & Stern

[57] ABSTRACT

The invention relates to a laminated glass panel incorporating therein a hologram sheet. For example, the laminated glass panel is a vehicle windshield in which the hologram sheet is used as a combiner of a head-up display. As adhesive means, the laminated glass panel uses either one sheet or two sheets of polyvinyl butyral resin (PVB) film. In the former case the hologram sheet is interposed between the PVB film and one of the glass plate and shielded from the PVB film by a transparent resin or glass film which prevents the plasticizer contained in the PVB film from transferring to the hologram sheet. In the latter case the hologram sheet is interposed between the two sheets of PBB film and shielded from each PVB film by a transparent resin or glass film having the aforementioned property. By virtue of the shielding of the hologram sheet from the PVB film, the diffraction wavelength of the hologram sheet does not significantly shift from the aimed wavelength. To prevent blurring of the holographic images, it is preferable that each transparent film for the shielding purpose has a very smooth surface at least on the side facing the PVB film.

9 Claims, 1 Drawing Sheet

LAMINATED GLASS PANEL INCORPORATING HOLOGRAM SHEET

BACKGROUND OF THE INVENTION

This invention relates to a laminated glass incorporating therein a hologram sheet. For example, the laminated glass panel is a vehicle windshield provided with a hologram sheet as a combiner of a head-up display.

It is known to dispose a hologram sheet in a laminated glass panel such as a vehicle windshield. Usually a laminated glass is produced by using a polyvinyl butyral (PVB) film as an adhesive intermediate film between two glass plates. Accordingly a hologram sheet incorporated in a laminated glass panel makes tight contact with a glass surface on one side and with the PVB film on the opposite side. With this construction the hologram sheet is not always sufficient in endurance to the environmental conditions.

For stronger protection of a hologram sheet incorporated in a laminated glass panel, JP-A 64-44414 shows using two sheets of PVB film as the adhesive and sandwiching the hologram sheet between the two PVB films. By this measure the hologram sheet is protected very firmly. However, with this construction it is often that in reproducing a holographic diffraction image the diffraction wavelength of the hologram sheet significantly deviates from the aimed wavelength. The amount of the deviation depends on the kind of the PVB film used in the laminated glass and in some cases reaches 80-100 nm so that the color of the holographic image differs from the intended color. For use in laminated glass there are many kinds of PVB films on the market, and it is inconvenient and difficult to exactly choose a PVB film which does not greatly affect the diffraction wavelength of a hologram sheet brought into contact with the PVB film.

Besides, when a hologram sheet is sandwiched between two sheets of PVB film in a laminated glass panel it is often that the holographic diffraction images are blurred.

SUMMARY OF THE INVENTION

It is an object of the present invention to provide a laminated glass panel which incorporates therein a hologram sheet without suffering from a significant shift of the diffraction wavelength of the hologram sheet from the aimed wavelength.

It is a further object of the invention to sufficiently reduce blurring of diffraction images produced by the hologram sheet incorporated in the laminated glass panel.

The present invention provides a laminated glass panel incorporating therein a hologram sheet. The laminated glass is made up of two transparent glass plates and either one sheet or two sheets of polyvinyl butyral resin film interposed between the two glass sheets as adhesive means. The PVB resin film contains a plasticizer as is usual. In the case of using only one sheet of PVB resin film the hologram sheet is interposed between the PVB resin film and one of the glass plates, and a transparent film which prevents the plasticizer from transferring from the PVB resin film to the hologram sheet is tightly interposed between the hologram sheet and the PVB resin film so as to shield the hologram sheet from the PVB resin film. In the case of using two sheets of PVB resin film the hologram sheet is interposed between the two PVB resin films, and a transparent film of the aforementioned type is tightly interposed between the hologram sheet and each PVB resin film so as to shield the hologram sheet from both of the two PVB resin films.

We have found that the main reason for the above described shift of the diffraction wavelength in the holographic reproducing operation of the hologram sheet incorporated in laminated glass is that the plasticizer contained in the PVB resin film transfers into the hologram sheet during the heat treatment for the laminating purpose. The intrusion of the plasticizer into the hologram sheet is liable to cause changes in the thickness and/or refractivity of the hologram sheet, and such changes result in a shift of the diffraction wavelength of the hologram sheet from the aimed wavelength. When the PVB film contains any other organic additive such as an ultraviolet absorber, it is likely that such an additive transfers into the hologram sheet together with the plasticizer and consequently augments the aforementioned changes. The amount of the shift of the diffraction wavelength depends on the kind of PVB film and can hardly be predicted.

According to the invention the transfer of the plasticizer and any other organic additive from the PVB resin film to the hologram sheet is blocked by the transparent film interposed between the hologram sheet and each PVB film in the laminated glass. Therefore, the hologram sheet in a laminated glass panel according to the invention does not exhibit a significant shift of the diffraction wavelength from the aimed wavelength. Besides, the provision of the transparent film has the effect of enhancing durability of the hologram sheet. The material of the transparent film for the shielding purpose is either a synthetic resin such as, for example, a polyester resin or a polyamide resin or an inorganic glass.

Furthermore, we have recognized that the main reason for blurring of holographic images produced by the hologram sheet in contact with the PVB film in laminated glass is the microscopical embossing of the PVB film surface. Each surface of a PVB film for use in laminated glass is microscopically embossed such that the surface roughness becomes about 20-30 $\mu$m for the purpose of dissipating the air temporarily trapped between the glass plates and the PVB film during the laminating operations. As the hologram sheet is brought into tight contact with the embossed surface of the PVB film the surface smoothness of the hologram sheet is marred, and this becomes a cause of blurring of holographic images.

According to the invention the unfavorable influence of the embossed surface of the PVB film is eliminated by using a film having a sufficiently smooth surface as the above described transparent film for blocking the transfer of the plasticizer. More specifically, it is suitable that the surface roughness of the transparent film is not more than 2 $\mu$m at least on the side facing the PVB film. It is preferable that the surface roughness of the transparent film is less than 1 $\mu$m and below the level of the wavelength of the hologram reproducing light source.

The present invention is advantageously embodied in a combiner of a head-up display in a vehicle, but this is not limitative. Laminated glass panels according to the invention are useful for displaying information of various categories on vehicle or building windows or advertising boards. Either a reflection hologram sheet or a transmission hologram sheet can be incorporated in a laminated glass panel according to the invention.

DESCRIPTION OF THE PREFERRED EMBODIMENTS

Figure 1:
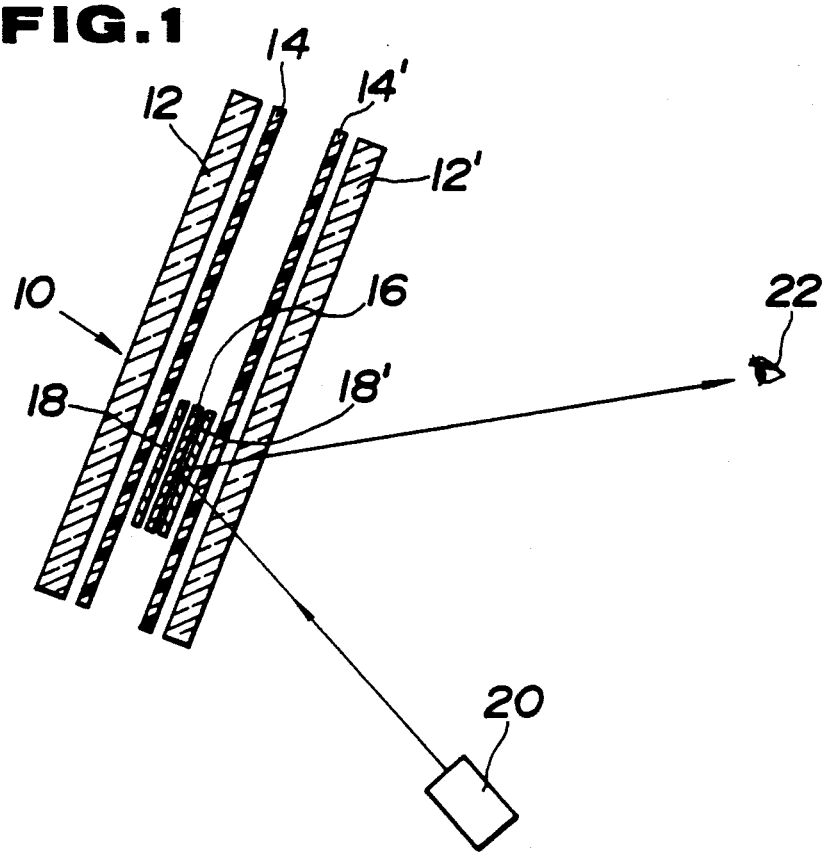
FIG. 1 shows, in an explanatorily exploded sectional view and as an embodiment of the invention, an automobile windshield of laminated glass in which a reflection hologram sheet is incorporated as a combiner of a head-up display.

FIG. 1 shows an automobile windshield 10 in which the present invention is embodied. The windshield 10 is of a laminated glass fundamentally made up of two transparent glass plates 12, 12' and two adhesive intermediate films 14, 14' of PVB. In the windshield 10, a reflection hologram sheet 16 is incorporated as a combiner of a head-up display. More particularly, the hologram sheet 16 is sandwiched between two transparent films 18, 18', and the resultant three-layer laminate is interposed between the two PVB films 14 and 14'. Therefore, the hologram sheet 16 is shielded from both of the two PVB films 14, 14'. As a combiner of a head-up display, the hologram sheet 16 reflects luminous information projected from an illuminant display 20 such as a fluorescent display to produce a holographic image visible to the driver's eyes 22.

The reflection hologram sheet 16 is produced by a known method. For example, a polyester film is used as the base of the hologram sheet 16, and the polyester film is first coated with a photosensitive agent such as dichromatic gelatin, a composition using a silver halide and a polymer of a carbazole derivative or a photosensitive polymer. For exposure of the photosensitive coating on the polyester film to record interference fringes in the coating, a laser beam is divided into two beams by a beam splitter such that the two beams impinge on the photosentive coating from the front side of the film and from the back side, respectively. After that the photosensitive coating is subjected to a thermal development treatment and chemical fixing treatment.

According to the invention the material of the transparent films 18, 18' is chosen so that the plasticizer and any other organic additive such as ultraviolet absorber contained in the PVB films 14, 14' may not transfer into the hologram sheet 16. The material of the transparent films 18, 18' can be selected from synthetic resins such as polyester resins, polycarbonate resins, acrylic resins, polyethylene resins, polyimide resins, polyamide resins, polyvinyl alcohol resins, polypropylene resins, polybutene resins, polyacrylonitrile resins, polymethylpentene resins and ionomer resins. Also it is possible to use film-like thin sheets of an inorganic glass.

It is suitable that each of the transparent films 18, 18' has a thickness in the range from 5 to 100 μm. Films thinner than 5 μm are inconvenient for the laminating operations, and when these films 18, 18' are thinner than 5 μm the expected effect of blocking the transfer of the plasticizer may not be sufficient. When the films 18, 18' are more than 100 μm in thickness, distortion of optical transmittance of the laminated glass panel 10 may not be negligible.

It is desirable that each of the transparent films 18, 18' has a very smooth surface on the side facing the hologram sheet 16 with a view to preventing blurring of diffraction images produced by the hologram sheet 16. More specifically it is desirable that, at least on the side facing the hologram sheet 16, the surface roughness of each film 18, 18' is not more than 2 μm, and preferably not more than 1 μm.

The windshield 10 of FIG. 1 is produced by covering the both surfaces of the hologram sheet 16 with the transparent films 18 and 18', respectively, placing the PVB films 14 and 14' on the respective glass plates 12 and 12', placing the hologram sheet 16 covered with the films 18, 18' between the two glass plates so as to be sandwiched between the two PVB films 14, 14' and applying heat and pressure to the resultant laminate in an autoclave.

When the transparent films 18, 18' are relatively weak in the strength of adhesion to the PVB films 14, 14' and the hologram sheet 16 as in the case of, for example, films of a polyethylene terephthalate resin among polyester resins, it is optional to enhance the adhesion strength of the films 18, 18' by a surface treatment to render the film surface active, such as ultraviolet ray irradiation treatment, corona discharge treatment or plasma treatment, or by the application of a suitable primer or adhesion promoting agent.

EXAMPLE 1

Samples of an automobile windshield of the construction shown in FIG. 1 were produced. In producing the reflection hologram sheet 16, dichromatic gelatin was used as the photosensitive coating material, and argon laser ($\lambda = 514.5$ nm) was used as the light source for exposure with a view to producing holographic images by a green light which is high in visibility.

As the adhesive intermediate films 14, 14', two kinds of commercially supplied PVB films, viz. PVB film A and PVB film B, were alternately used. Both the PVB films A and B were 0.38 mm in thickness. Each of the transparent films 18, 18' was a polyethylene terephthalate film which was 50 μm in thickness and less than 2 μm in surface roughness.

For comparison, modified samples were produced by omitting the transparent films 18, 18'. Also in this case the PVB films A and B were alternately used.

The laminated glass panel samples were each subjected to measurement of diffraction wavelength. As to the samples using the transparent films 18, 18', the diffraction wavelength was 553 nm in the case of using the PVB film A and 552 nm in the case of using the PVB film B. That is, in either case the diffraction wavelength was nearly as aimed. As to the samples not using the transparent films 18, 18', the diffraction wavelength was 540 nm in the case of using the PVB film A and 658 nm in the case of using the PVB film B. The diffraction wavelength of 658 nm means more than 100 nm deviation from the aimed value.

With the samples using the PVB film B and not using the transparent films 18, 18', it was impossible to produce a holographic image in green color by projection of green light from a fluorescent display tube: the holographic image was in a red color. The samples using the transparent films 18, 18' were tested as a combiner of a head-up display in the manner as shown in FIG. 1. Irrespective of the kind of the PVB films 14, 14' (PVB film A or PVB film B), a holographic diffraction image in green color was clearly visible to the driver's eyes without perceptible blurring of the image.

Figure 2:
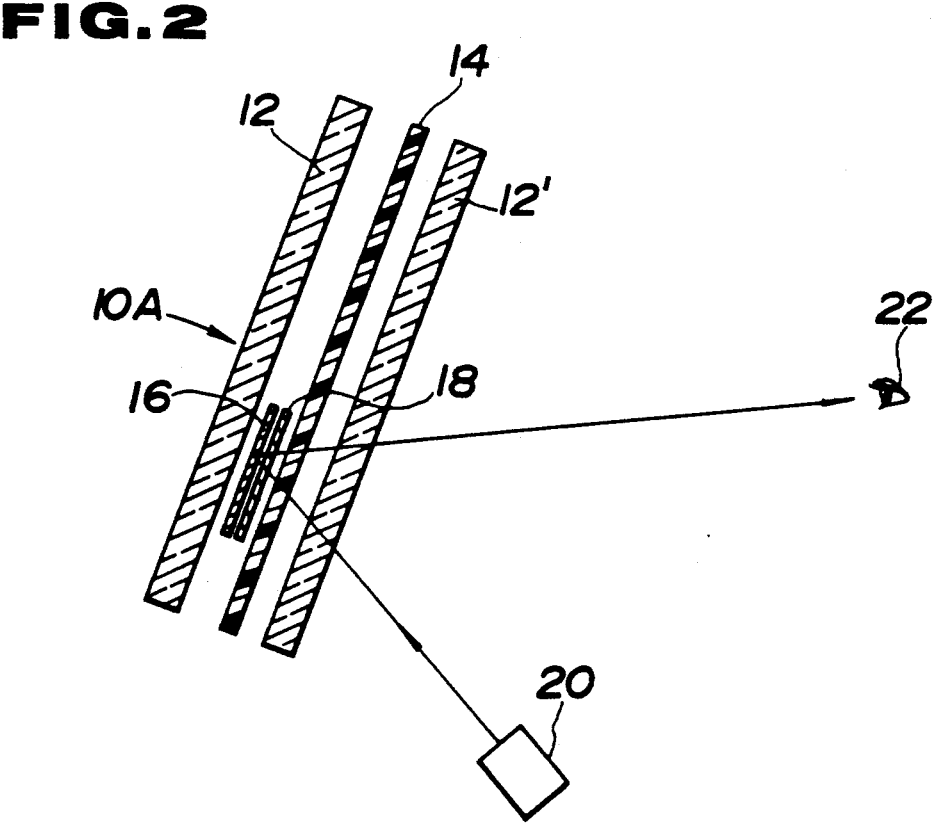
FIG. 2 shows a modification of the lamination structure of the windshield of FIG. 1.

FIG. 2 shows another automobile windshield 10A according to the invention. Fundamentally this windshield 10A is made of a laminated glass using only one sheet of PVB film 14 as the adhesive. A reflection hologram sheet 16 is disposed between the outside glass plate 12 and the PVB film 14 together with a transparent film 18 which protects the hologram sheet 16 against transfer of the plasticizer from the PVB film 14. The material, thickness and surface roughness of the transparent film 18 are as described with respect to the films 18, 18' in FIG. 1.

EXAMPLE 2

Samples of the windshield 10A of FIG. 2 were produced by alternately using two kinds of commercially supplied PVB films, viz, PVB film A' and PVB film B', as the adhesive intermediate film 14. Both the PVB films A' and B' were 0.76 mm in thickness. The reflection hologram sheet 16 was the same as in Example 1. The transparent film 18 was a polyamide resin film which was 20 μm in thickness and less than 2 μm in surface roughness.

With either of the two kinds of samples, irresepective of the kind of the PVB film 14, the diffraction wavelength was close to the aimed wavelength. By testing each sample in the arrangement as shown in FIG. 2, a holographic diffraction image in green color was clearly visible to the driver's eyes without perceptible blurring of the image.

The lamination structure shown in FIG. 2 was modified by disposing the hologram sheet 16 between the inside glass plate 12' and the PVB film 14 and the transparent polyamide film 18 between the hologram sheet 16 and the PVB film 14, and the above described tests were made on samples of the modified windshield. There was substantially no difference in the test results.

What is claimed is:

1. A laminated glass panel, comprising:
    two transparent glass plates arranged opposite and parallel to each other;
    a polyvinyl butyral resin film which contains a plasticizer and is interposed between the two glass plates as adhesive means;
    a hologram sheet interposed between said polyvinyl butyral resin film and one of the two glass plates; and
    a transparent film which is tightly interposed between said hologram sheet and said polyvinyl butyral resin film so as to shield said hologram sheet from said polyvinyl butyral resin and prevents said plasticizer from transferring from said polyvinyl butyral resin film to said hologram sheet, wherein the surface roughness of said transparent film is not more than 2 μm at least on the side facing said polyvinyl butyral resin film.

2. A laminated glass panel according to claim 1, wherein the material of said transparent film is a synthetic resin.

3. A laminated glass panel according to claim 2, wherein said synthetic resin is selected from the group consisting of polyester resins, polycarbonate resins, acrylic resins, polyethylene resins, polyimide resins, polyamide resins, polyvinyl alcohol resins, polypropylene resins, polybutene resins, polyacrylonitrile resins, polymethylpentene resins and ionomer resins.

4. A laminated glass panel according to claim 1, wherein the material of said transparent film is an inorganic glass.

5. A laminated glass panel according to claim 1, further comprising another polyvinyl butyral resin film which contains a plasticizer and is interposed as supplementary adhesive means between said polyvinyl butyral resin film and said one of the glass plates so as to interpose said hologram sheet between the two polyvinyl butyral resin films, and another transparent film whose surface roughness is not more than 2 μm at least on the side facing said another polyvinyl butyral resin film which is tightly interposed between said hologram sheet and said another polyvinyl butyral resin film so as to shield said hologram sheet from said another polyvinyl butyral resin film and prevents the plasticizer in said another polyvinyl butyral resin film from transferring to said hologram sheet.

6. A laminated glass panel according to claim 5, wherein the material of said transparent film and said another transparent film is a synthetic resin.

7. A laminated glass panel according to claim 6, wherein said synthetic resin is selected from the group consisting of polyester resins, polycarbonate resins, acrylic resins, polyethylene resins, polyimide resins, polyamide resins, polyvinyl alcohol resins, polypropylene resins, polybutene resins, polyacrylonitrile resins, polymethylpentene resins and ionomer resins.

8. A laminated glass panel according to claim 5, wherein the material of said transparent film and said another transparent film is an inorgnic glass.

9. A laminated glass panel according to claim 1, wherein said hologram sheet is a reflection hologram sheet.

* * * * *